US006975606B2

(12) United States Patent
Korinek et al.

(10) Patent No.: US 6,975,606 B2
(45) Date of Patent: Dec. 13, 2005

(54) METHOD AND APPARATUS FOR REMOVING A BASE TRANSCEIVER STATION FROM A WIRELESS COMMUNICATION SYSTEM

(75) Inventors: Frank W. Korinek, South Elgin, IL (US); Richard L. Van Egeren, Arlington Heights, IL (US)

(73) Assignee: Motorola, Inc., Schaumburg, IL (US)

( * ) Notice: Subject to any disclaimer, the term of this patent is extended or adjusted under 35 U.S.C. 154(b) by 965 days.

(21) Appl. No.: 09/812,874

(22) Filed: Mar. 19, 2001

(65) Prior Publication Data

US 2002/0131378 A1 Sep. 19, 2002

(51) Int. Cl.[7] .............................. H04Q 7/00; H04Q 7/20
(52) U.S. Cl. ...................... 370/331; 370/242; 370/217; 455/436; 455/423
(58) Field of Search ................................ 370/242–244, 370/331, 216–228, 95 T; 455/436–444, 422.1, 455/423–424, 453, 455, 67.11, 522

(56) References Cited

U.S. PATENT DOCUMENTS 5,499,395 A * 3/1996 Doi et al. ................ 455/422.1
5,584,049 A * 12/1996 Weaver et al. ........... 455/67.11

* cited by examiner

Primary Examiner—Steven Nguyen
(74) Attorney, Agent, or Firm—Jeffrey K. Jacobs

(57) ABSTRACT

A subscriber unit (104) is gracefully migrated from a selected base transceiver station (108) to an alternate base transceiver station (108) by attenuating the communication signals transmitted by the selected base transceiver station (108). A subscriber unit (104) communicatively coupled to the selected base transceiver station (108) compares the attenuated communication signal strength to communications signals generated by alternate base transceiver stations (108) until an alternative communication signal having greater signal strength is identified. The subscriber unit (104) then migrates to the base transceiver station (108) transmitting the alternative communication signal. The rate of active data packet transmissions to a subscriber unit (104) is increased by using all available traffic channels to transmit data packet. A message is transmitted to a subscriber unit (104) attempting to establish communicative coupling with the selected base transceiver station (108) to delay attempts to initiate a communicative coupling with the wireless communication network (102).

20 Claims, 4 Drawing Sheets

METHOD AND APPARATUS FOR REMOVING A BASE TRANSCEIVER STATION FROM A WIRELESS COMMUNICATION SYSTEM

FIELD OF THE INVENTION

The present invention relates generally to a method and apparatus for use in a wireless communication system and, more particularly to a method and apparatus for removing a base transceiver station from a wireless communication system.

BACKGROUND OF THE INVENTION

A wireless communication system typically includes a communication network providing coverage of a designated geographic region and a plurality of subscriber units. The wireless communication system generally enables a subscriber unit to communicate with other communication devices, such as for example, other subscriber units, the Internet and traditional phones, via the communication network. Communication between subscriber units and the communication network typically occur over radio frequency (RF) channels that provide physical paths over which communication signals such as voice, data and video are transmitted.

The communication network includes a plurality of base transceiver stations (BTS) which provide communication coverage of a specific geographic area. The area covered by the communication network is typically divided into a number of smaller communication sites (cells) where each communication site is serviced by at least one BTS. Each BTS includes at least one radio transceiver for enabling communication with one or more subscriber units operating within the associated cell. The BTSs are coupled to at least one base station controller (BSC). Depending on the configuration of the communication network, a BSC may be adapted to control a single BTS or a cluster of multiple BTSs. Each BSC is further interfaced to a mobile switching center (MSC). The MSC communicatively couples the BSC to a public switched telephone network (PSTN) and potentially to other communication networks.

Each BTS is generally associated with a BTS controller for managing the cell resources for that BTS. In many communication systems, the BTS controller is integrated with the BSC such that the resource allocation functions are performed by the BSC, while in other systems, such as the Integrated Digital Enhanced Network System (iDEN), each BTS includes a BTS controller for managing its own resources.

Each communication site is typically assigned a dedicated control channel and a number of traffic channels for handling call traffic within the communication site. The control channel, typically under the control of the BTS controller, is utilized by the BTS and subscriber units to request and establish communication service. The control channels typically continuously broadcast system data and a listing of neighboring BTSs.

In order to initiate or receive calls, a subscriber unit must first register with the communication network. The subscriber unit begins by monitoring the strength of the control signals transmitted via control channels by different BTSs within range of the subscriber unit. The subscriber unit then registers with the communication network via the control channel for one of the BTSs, typically the BTS transmitting the control signal having the greatest signal strength. The subscriber unit also stores the listing of neighboring communication sites associated with the selected BTS in a subscriber unit memory.

Once the registration process is complete, the subscriber unit is enabled to initiate and receive calls via the selected BTS. To initiate a voice call, such as for example an interconnect call or a dispatch call, or a data packet transfer, such as for example downloading e-mail, the subscriber unit issues a message to the selected BTS via the control channel. The BTS controller then determines whether the subscriber unit is attempting to initiate a voice call or a data packet transfer. If the BTS controller determines that the subscriber unit is attempting to initiate a voice call, the BTS controller dynamically assigns a traffic channel to the subscriber unit and communicative coupling is established between the subscriber unit and the selected BTS. If the subscriber unit is attempting to initiate a data packet transfer, the BTS controller allocates unused traffic channels for data packet transmission to the subscriber unit thereby establishing communicative coupling between the subscriber unit and the selected BTS. A predefined number of traffic channels are typically reserved for voice calls so that data packet transmissions do not impact the BTS's ability to accommodate voice calls. The BTS controller continuously monitors the availability of traffic channels and dynamically reassigns traffic channels as necessary to support both voice calls and data packet transmissions. Under normal operating conditions, once a subscriber unit is registered or is communicatively coupled to the communication network via a specific BTS, the subscriber unit remains communicatively coupled to that BTS so long as the subscriber unit remains within that BTS communication site.

BTSs require routine maintenance procedures and periodic software code and configuration updates to ensure optimum operation of the wireless communication system. The performance of these procedures typically require that the BTS be removed from the communication network. In addition, the onset of unexpected malfunctions can cause degradation in BTS performance thereby affecting the BTS's ability to support communication functions and necessitating the transfer of subscriber units from the affected BTS to an alternate BTS at a neighboring communication site. Such malfunctioning BTSs are often removed from the communication network to perform trouble shooting procedures and implement corrective action.

One prior art method of removing a selected BTS from the communication network, involves the implementation of a communication protocol between the communication network and the subscriber units so that subscriber units communicatively coupled to a particular BTS can be forced to migrate to an alternate BTS. This prior art method requires the expensive process of reflashing and retooling existing subscriber units.

Current technologies do not provide a cost effective method or apparatus for gracefully removing an active BTS from a communication network by transferring subscriber units engaged in calls to an alternate BTS without an interruption in communication services. Typically calls are dropped without any advance notice. The subscriber is required to re-initiate a new call at a neighboring communication site via an alternate BTS. If a subscriber unit is in the process of receiving a data packet transmission via the affected BTS, the data transmission is typically interrupted. The subscriber is required to reinitiate a new call via an alternate BTS and request retransmission of the entire data packet transmission. In addition, new subscribers are not precluded from communicatively coupling to the communication network via the affected BTS.

Thus there is a need for a cost effective method and apparatus for removing a selected BTS from a wireless communication system that minimizes the impact on communication services provided to subscribers.

SUMMARY OF THE INVENTION

In a communication system that includes a first base transceiver station (BTS) providing communication coverage of a first area and a second BTS providing communication coverage of a second area, a method is provided for removing the first BTS from the communication system while maintaining communication coverage of both first and second areas. A first signal is transmitted from a first BTS having a first signal strength. A second signal is transmitted from a second BTS having a second signal strength, the first signal strength of the first signal in the first area being greater than the second signal strength of the second signal in the first area. A command to remove the first BTS from the communication system is received, and the first signal strength of the first signal is reduced until the second signal strength of the second sign, in the first area is greater than the first signal strength of the first signal in the first area to cause a subscriber unit communicatively coupled to the first BTS to remove communicative coupling with the first BTS and establish communicative coupling with the second BTS.

In a communication system that includes a first BTS providing communication coverage of a first area and a second BTS providing communication coverage of a second area, an apparatus is provided for removing the first BTS from the communication system while maintaining communication coverage of both first and second areas. The apparatus includes a first BTS adapted to transmit a first signal having a first signal strength, a second BTS adapted to transmit a second signal having a second signal strength (the first signal strength of the first signal in the first area being greater than the second signal strength of the second signal in the first area), and a controller responsive to a command to remove the first BTS from the communication system and which issues a command to the first BTS to reduce the first signal strength of the first signal until the second signal strength of the second signal in the first area is greater than the first signal strength of the first signal in the first area to cause a subscriber unit communicatively coupled to a first BTS to remove communicative coupling with the first BTS and establish communicative coupling with the second BTS.

DETAILED DESCRIPTION OF THE PREFERRED EMBODIMENTS

The present invention provides a method and an apparatus for removing a base transceiver station (BTS) from a communication network in a wireless communication system while minimizing the impact on communication services provided to subscribers. In addition, the implementation of the present invention does not require the expensive reprogramming or reflashing of subscriber units. Although the wireless communication system disclosed herein is primarily associated with a cellular communication system, those having ordinary skill in the art will readily appreciate that the teachings of the present invention may be applied to other types of wireless communication systems.

Figure 1:
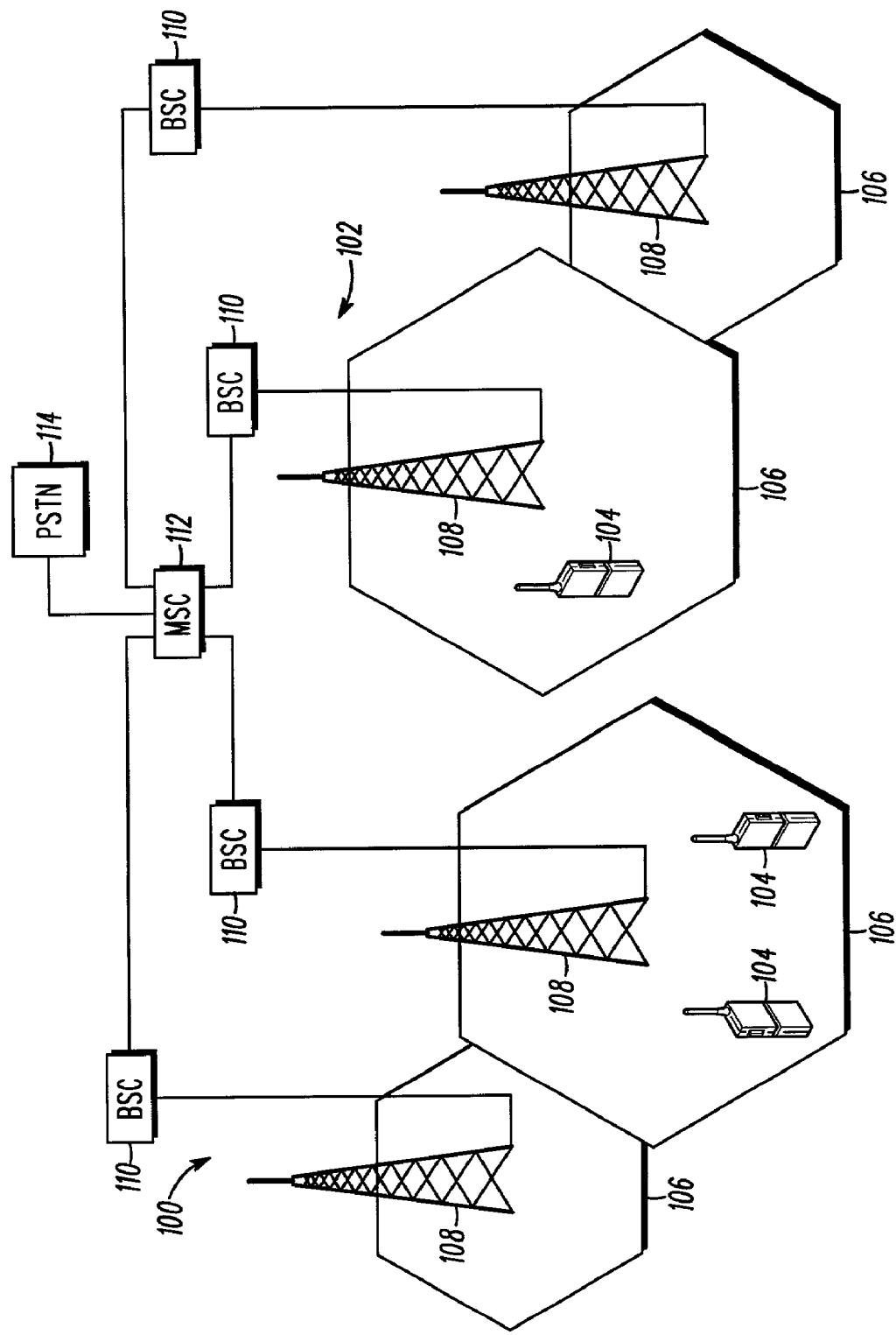
FIG. 1 is a block diagram of a wireless communication system that may be adapted to operate in accordance with the preferred embodiments of the present invention.

Referring to FIG. 1, a typical wireless communication system 100, which may benefit from the principles of the present invention, is shown. The present invention is described in terms of several preferred embodiments, and particularly, in terms of a wireless communication system operating in accordance with one of several communication standards. These standards include analog, digital or dual-mode communication system protocols such as, but not limited to, the Advanced Mobile Phone System (AMPS), the Narrowband Advanced Mobile Phone System (NAMPS), the Global System for Mobile Communications (GSM), the IS-55 Time Division Multiple Access (TDMA) digital cellular, the IS-95 Code Division Multiple Access (CDMA) digital cellular, the Personal Communications System (PCS), General Packet Radio Services (GPRS), Enhanced Data Rates for Global Evolution (EDGE) and variations and evolutions of these protocols.

The wireless communication system 100 generally includes a communication network 102 and a plurality of subscriber units 104. The communication network 102 provides coverage of a geographic area that is sub-divided into a number of smaller communication sites or cells 106 using a plurality of BTSs 108. Each cell 106 is preferably serviced by at least one BTS 108, and each cell 106 may be further divided into sectors (not depicted) with each sector being serviced by a BTS or one or more transceivers of a BTS as is well known. Each of the BTSs 108 is coupled to a base station controller (BSC) 110. In a preferred embodiment, each BSC 110 is suitably coupled to control a single BTS 108, however, a BSC 110 may be suitably coupled to a cluster of multiple BTSs 108 without departing from the spirit of the present invention. The BSCs 110 are communicatively coupled to a mobile switching center (MSC) 112, which is further coupled to a public switched telephone network (PSTN) 114.

Figure 2:
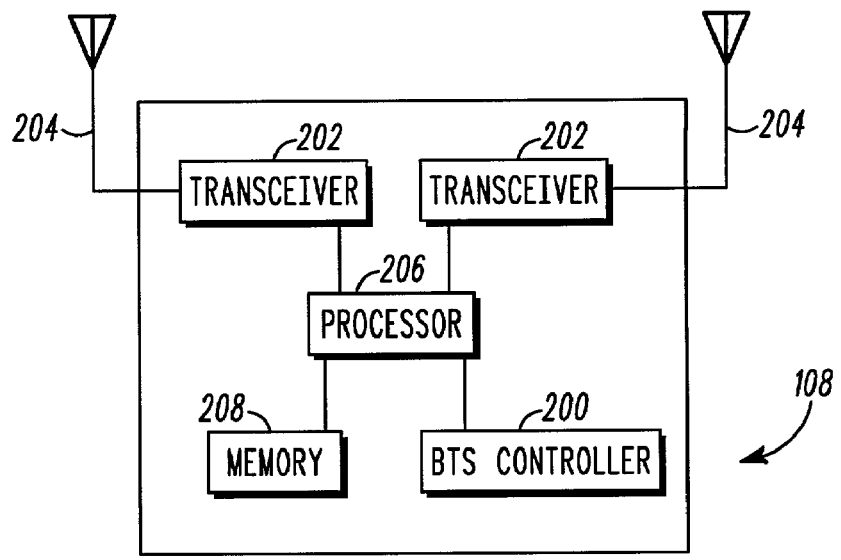
FIG. 2 is a block diagram of a base transceiver station that may be adapted to operate in accordance with the preferred embodiments of the present invention.

Referring now to FIG. 2, the BTS 108 generally includes, a BTS controller 200, one or more radio transceivers 202, each associated with an antenna 204, a BTS processor 206 and a BTS memory 208. The BTS processor 206 is coupled to the radio transceivers 202 and the BTS memory 208 and operates the BTS 108 by executing a program or a set of operating instructions stored in the BTS memory 208. The BTS processor 206 is also operably coupled to the BTS controller 200. The BTS controller 200 typically manages radio frequency (RF) resources for the BTS 108. The BTS 108 transmits and receives RF signals from subscriber units 104 via the antennas 204. In an alternative embodiment, the BSC 110 may be configured to perform the controller functions performed by the BTS controller 200 and the BTS controller 200 is eliminated from the BTS architecture.

Figure 3:
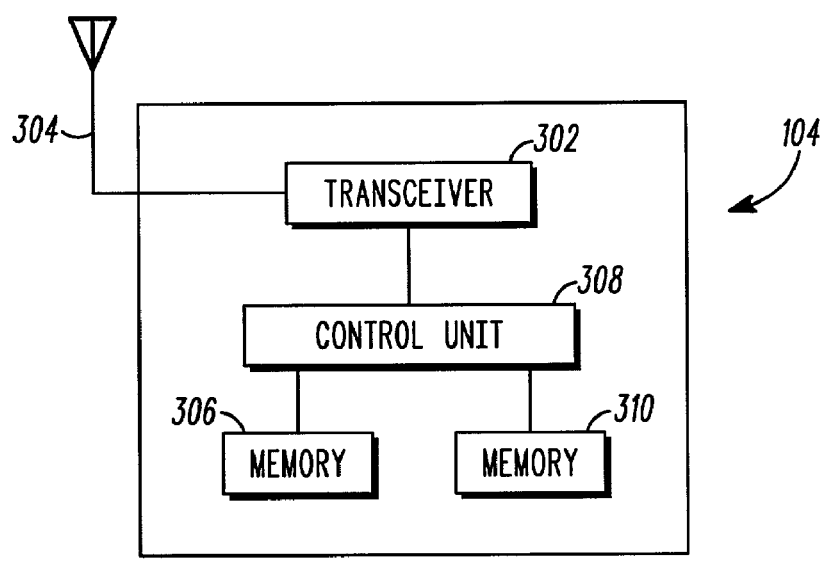
FIG. 3 is a block diagram of a subscriber unit that may be adapted to operate in accordance with the preferred embodiments of the present invention.

Referring now to FIG. 3, the subscriber unit 104 generally includes a subscriber transceiver 302 coupled to a subscriber antenna 304, a subscriber memory 306 and a subscriber control unit 308. The subscriber control unit 308 is operatively coupled to the subscriber transceiver 302 and the subscriber memory 306. The subscriber memory 306 stores operating instructions to operate the subscriber unit 104 as is well known in the art. Additional memory 310 may be provided to store data, such as for example downloaded e-mail.

The wireless communication system 100 utilizes RF channels to provide a communication link between a subscriber unit 104 and a BTS 108 in the communication network 102. The BTS 108 typically uses a dedicated control channel and one of a number of traffic channels to communicate with a subscriber unit 104 within a cell 106. The BTS controller 200 manages the radio frequency channel resources for the BTS 108. The control channel for a particular BTS 108 typically broadcasts general system data and a listing of one or more neighboring BTSs 108.

Before a subscriber unit 104 can receive or initiate calls, the subscriber unit 104 is required to first register with a particular BTS 108 in the communication network 102. Upon power up, the subscriber unit 104 begins scanning the control signals transmitted on the control channels associated with different BTSs 108 within range of the subscriber unit 104. The subscriber unit 104 then identifies the control signal having the greatest signal strength and registers via the BTS 108 associated with the identified control signal.

To initiate a voice call or a data packet transfer, the subscriber unit 104 transmits the appropriate message to the selected BTS 108 via the control channel. The BTS controller 200 then determines whether the subscriber unit 104 is attempting to initiate a voice call, such as for example an interconnect call or a dispatch call, or a data packet transfer, such as for example downloading e-mail. If the subscriber unit 104 is attempting to initiate a voice call, the BTS controller 200 dynamically assigns a traffic channel to the subscriber unit 104 and communicative coupling is established between the subscriber unit 104 and the selected BTS 108. If the subscriber unit 104 is attempting to initiate a data packet transfer, the BTS controller 200 allocates unused traffic channels for data packet transmission to the subscriber unit 104 thereby establishing communicative coupling between the subscriber unit 104 and the selected BTS 108. A predefined number of traffic channels are typically reserved for voice calls so that data packet transmissions do not impact the BTS's 108 ability to accommodate voice calls. In addition, the BTS controller 200 continuously monitors the availability of traffic channels and dynamically reassigns traffic channels as necessary to support both voice calls and data packet transmissions. As mentioned previously, the BTS controller may be eliminated and the BSC 110 may be adapted to perform the functions performed by the BTS controller 200 without departing from the spirit of the invention.

Figure 4:
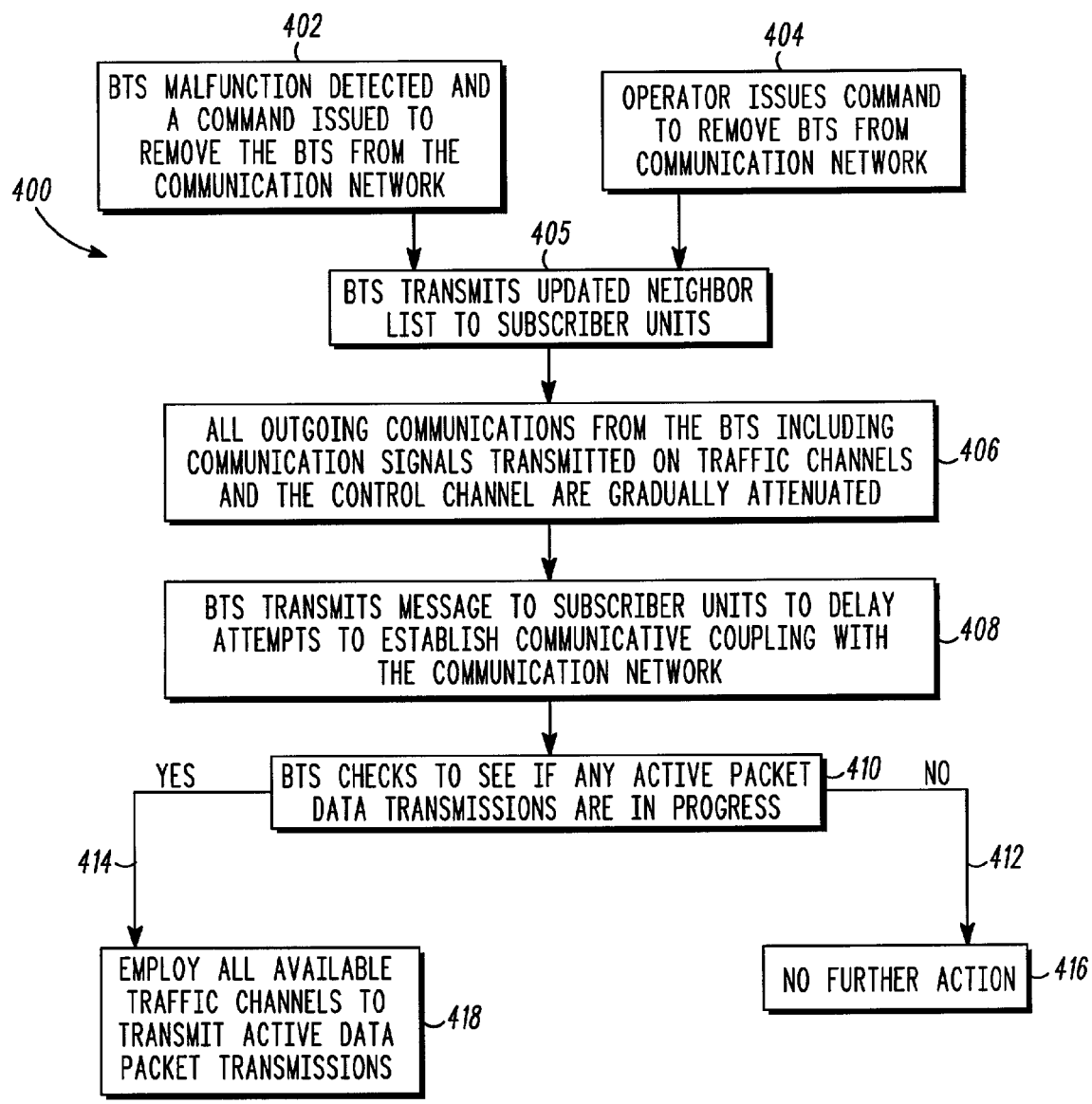
FIG. 4 is a flow chart illustrating a method of removing a selected base transceiver station (BTS) from a wireless communication system in accordance with a preferred embodiment of the present invention.

Referring now to FIG. 4, a preferred method 400 of removing a selected BTS 108 from a wireless communication network begins at step 402 or step 404. The BTS 108 typically monitors its own performance by checking various operational parameters, such as for example, relating to operation of the BTS controller board and radio transceiver controller boards. If the value of an operational parameter appears to be indicative of a malfunction or of degradation in the performance, the BTS 108 initiates a sequence of steps to remove itself from the wireless communication network 102. In an alternative embodiment, the BSC 110 monitors the performance of the one or more BTSs under its control and upon the detection of a malfunction in the performance of a particular BTS 108, issues the command to remove the malfunctioning BTS 108 from the communication network. The method 400 is initiated at step 402 upon the detection of a BTS malfunction. In addition, the performance of routine maintenance procedures, such as for example software code and/or configuration updates, often require that the BTS 108 be removed from the wireless communication network 100. In such cases, an operator typically issues a command to remove the BTS 108 from the communication system as indicated in step 404.

Responsive to the detection of a BTS malfunction at step 402 or an operator issued command at step 404, the BTS controller 200 issues a command to the BTS 108 to transmit an updated list of one or more neighboring BTSs at step 405 and then issues a command at step 406 to the radio transceiver 202 to initiate a gradual attenuation of all outgoing communication signals, such as for example, communication signals transmitted on traffic channels and the control channel. At step 408, the BTS 108 broadcasts a message on its control channel to any subscriber unit 104 attempting to establish communicative coupling, in other words, initiate a call via the selected BTS 108. The message instructs such a subscriber unit 104 to delay attempts to connect to the communication network 102. The message is transmitted until the attenuated communication signals transmitted by the selected BTS 108 are weaker than the communication signals generated by a neighboring BTS 108. At this point, when the affected subscriber unit 104 re-attempts to communicatively couple with the communication network 102, the subscriber unit 104 identifies an alternative BTS 108 to establish a connection with the communication network 102.

The selected BTS 108 then determines if any active data packet transmissions are in progress to subscriber units 104 at step 410. If there are no active data packet transfers in progress 412 then the method is complete 416. If the BTS 108 identifies at least one active data packet transfer in progress 414, all unused traffic channels are allocated to the transmission of the data packet thereby increasing the rate of active data packet transmission at step 418. During normal operation of the BTS 108, unused traffic channels are generally allocated for data packet transmission to the subscriber unit 104. However, a predefined number of traffic channels are typically reserved for voice calls so that data packet transmissions do not impact the BTS's 108 ability to accommodate voice calls. At step 418 all unused traffic channels including those normally reserved for voice calls are employed to increase the data packet transmission rate. One or more of the steps outlined in the method 400 may be performed under the control of the BTS controller 200. In an alternative embodiment, the BSC 110 associated with the selected BTS 108 may control the performance of one or more of the steps of method 400.

Figure 5:
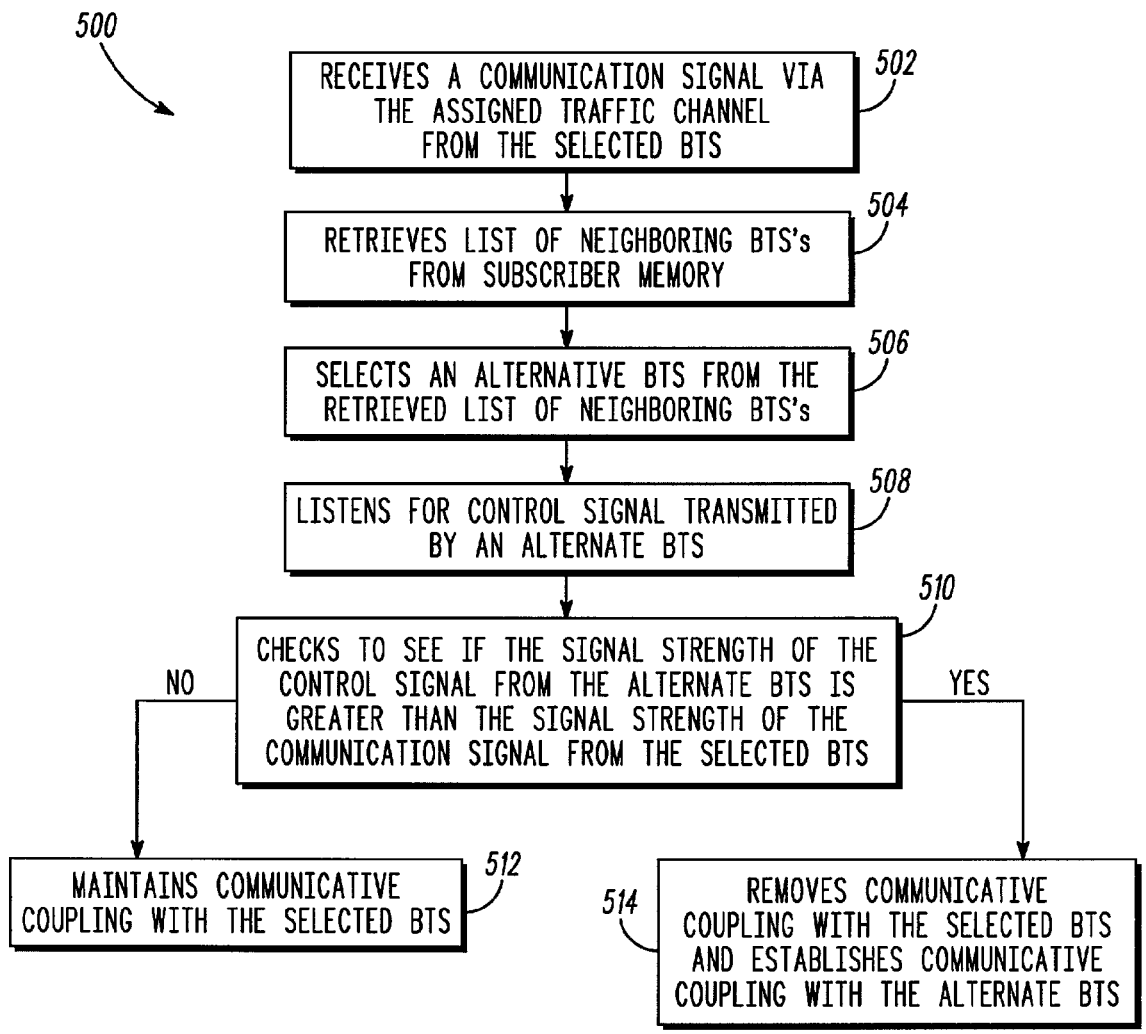
FIG. 5 is a flow chart illustrating a method of determining when to migrate a subscriber unit from the selected BTS to an alternate BTS.

Referring to FIG. 5, a preferred method 500 of determining when to migrate a subscriber unit 104 that is communicatively coupled to the selected BTS 108 to an alternate BTS 108 within the communication network 102 begins at step 502. The subscriber unit 104 performs this process on a periodic basis. At step 502, the subscriber unit 104 receives a communication signal from the selected BTS 108.

During the process of initially registering with the communication network 102 via the selected BTS 108, the selected BTS 108 typically transmits data pertaining to one or more neighboring BTSs 108, including, if applicable, adjoining sectors of the cell 106, to the subscriber unit 104 via the control channel. The subscriber unit 104 stores the received list in the subscriber memory 306. As mentioned previously, the BTS 108 transmits an updated list at step 405 prior to beginning the communication signal attenuation process. At step 504, the subscriber unit 104 retrieves the list from the subscriber memory 306 and at step 506, selects an alternate BTS 108, or alternate sector, from the list. The subscriber unit 104 then begins to listen for a communication signal, such as a control signal transmitted by the alternate BTS 108 via its control channel, at step 508.

Once the communication signal from the alternate BTS 108 is received, the subscriber control unit 308 proceeds to compare the signal strength of the communication signal received from the alternate BTS 108 with the communication signal received from the selected BTS 108 at step 510. If subscriber unit 104 determines that the communication signal received from the selected BTS is stronger than the communication signal received from the alternate BTS, the subscriber unit maintains communicative coupling with the selected BTS 108 at step 512. If the subscriber unit 104 determines that the communication signal received from the alternate BTS 104 is stronger than that received from the selected BTS 108, the subscriber unit 104 removes communicative coupling with the selected BTS 108 and establishes communicative coupling with the alternate BTS 108 at step 514. Since the selected BTS 108 is in the process of gradually attenuating it communication signals on both the control channel and all traffic channels, the communication signal received by the subscriber unit 104 via its assigned traffic channel is an attenuated communication signal. At step 510, the subscriber unit 104 will find the signal strength of the communication signal received from the alternate BTS 108 to be greater than the signal strength of the communication signal received from the selected BTS 108. This finding will cause the subscriber unit 104 to remove communicative coupling with the selected BTS 108 and migrate to the alternate BTS 108.

Numerous modifications and alternative embodiments of the invention will be apparent to those skilled in the art. For example, a BTS 108 may be adapted in accordance with the preferred embodiments of the invention to permit single, or multiple transceivers at a single BTS 108 to be removed from operation without removing the entire BTS 108 from operation. Similarly, individual sectors of a cell 106 may be removed from operation. The details of the structure may be varied substantially without departing from the spirit of the invention, and the exclusive use of all modifications which come within the scope of the appended claims is reserved.

We claim:

1. In a communication system including a first base transceiver station (BTS) providing communication coverage of a first area and a second BTS providing communication coverage of a second area, a method of removing the first BTS from the communication system while maintaining communication coverage of both first and second areas, the method comprising the steps of:

transmitting a first signal from a first BTS having a first signal strength;

transmitting a second signal from a second BTS having a second signal strength, the first signal strength of the first signal in the first area being greater than the second signal strength of the second signal in the first area;

receiving a command to remove the first BTS from the communication system;

reducing the first signal strength of the first signal until the second signal strength of the second signal in the first area is greater than the first signal strength of the first signal in the first area to cause a subscriber unit communicatively coupled to the first BTS to remove communicative coupling with the first BTS and establish communicative coupling with the second BTS;

determining whether an active data packet transmission is in progress via the first BTS; and increasing a transmission rate of the active data packet transmission from the first BTS when the active data packet transmissions is determined to be in progress and responsive to the command to remove the first BTS from the communication system.

2. The method of claim 1, wherein increasing the transmission rate of the active data packet transmission comprises increasing the transmission rate of the active data packet transmission via unused traffic channels.

3. The method of claim 2, wherein the step of increasing the transmission rate of the active data packet transmission from the first BTS further includes transmitting the active data packet transmission via unused traffic channels normally reserved for voice calls.

4. The method of claim 1, further including the step of transmitting a message adapted to be received by a second subscriber unit in the first area to delay attempts to establish communicative coupling with a communication network until the second signal strength of the second signal in the first area is greater than the first signal strength of the first signal in the first area.

5. The method of claim 4, wherein the step of transmitting the message adapted to be received by the second subscriber unit further includes transmitting the message via a control channel.

6. The method of claim 1, further including the steps of identifying a malfunction in the operation of the first BTS and issuing a command to remove the first BTS from the communication system.

7. The method of claim 1, wherein the step of receiving a command to remove the first BTS from the communication system further includes receiving an operator command to remove the first BTS from the communication system.

8. The method of claim 1, further including the step of transmitting a list including at least one BTS neighboring the first BTS.

9. The method of claim 8, wherein the stop of transmitting a list including at least one BTS neighboring the first BTS further includes transmitting an updated list including at least one BTS neighboring the first BTS prior to the step of reducing the first signal strength of the first signal.

10. In a communication system including a first base transceiver station (BTS) providing communication coverage of a first area and a second BTS providing communication coverage of a second area, an apparatus for removing the first BTS from the communication system while maintaining communication coverage of both first and second areas, the apparatus comprising:

a first BTS adapted to transmit a first signal having a first signal strength;

a second BTS adapted to transmit a second signal having a second signal strength, the first signal strength of the first signal in the first area being greater than the second signal strength of the second signal in the first area;

a controller responsive to a command to remove the first BTS from the communication system and which issues a command to the first BTS to reduce the first signal strength of the first signal until the second signal strength of the second signal in the first area is greater than the first signal strength of the first signal in the first area to cause a subscriber unit communicatively coupled to a first BTS to remove communicative coupling with the first BTS and establish communicative coupling with the second BTS, wherein the first BTS is further adapted to determine whether an active data packet transmission is in progress via the first BTS and adapted to increase a transmission rate of the active data packet transmission when the active data packet transmissions is determined to be in progress and responsive to the command to remove the first BTS from the communication system.

11. The apparatus of claim 10, whdrein the first BTS is adapted to increase the transmission rate of the active data packet transmission via unused traffic channels.

12. The apparatus of claim 10, wherein the first BTS is adapted to increase the transmission rate of the active data packet transmission via unused traffic channels normally reserved for voice calls.

13. The apparatus of claim 10, wherein the first BTS is adapted to transmit a message adapted to be received by a second subscriber unit in the first area to delay attempts to establish communicative coupling with a communication network until the second signal strength of the second signal in the first area is greater than the first signal strength of the first signal in the first area.

14. The apparatus of claim 13, wherein the first BTS is adapted to transmit the message via a control channel.

15. The apparatus of claim 10, wherein the controller is adapted to issue a command to remove the first BTS from the communication system in response to the detection of a malfunction in the operation of the first BTS.

16. The apparatus of claim 10, wherein the controller is adapted to issue a command to remove the first BTS from the communication system in response to an operator command.

17. The apparatus of claim 10, wherein the first BTS is adapted to transmit a list including at least one BTS neighboring the first BTS.

18. The apparatus of claim 10, wherein the controller issues a command to the first BTS to transmit an updated list including at least one BTS neighboring the first BTS in response to a command to remove the first BTS from the communication system.

19. The apparatus of claim 10, wherein the controller comprises a base station controller (BSC).

20. The apparatus of claim 10, wherein the controller comprises a BTS controller.

* * * * *